United States Patent
Golomb

(10) Patent No.: US 8,756,695 B1
(45) Date of Patent: Jun. 17, 2014

(54) ANALYSIS OF BINARY CODE

(75) Inventor: Gary J. Golomb, New Windsor, MD (US)

(73) Assignee: EMC Corporation, Hopkinton, MA (US)

( * ) Notice: Subject to any disclaimer, the term of this patent is extended or adjusted under 35 U.S.C. 154(b) by 177 days.

(21) Appl. No.: 13/281,574

(22) Filed: Oct. 26, 2011

Related U.S. Application Data

(60) Provisional application No. 61/406,738, filed on Oct. 26, 2010.

(51) Int. Cl.
*G06F 21/00* (2013.01)

(52) U.S. Cl.
USPC .................. 726/25; 726/22; 726/23; 726/24; 709/206; 370/328; 713/188

(58) Field of Classification Search
USPC ................................................ 726/1, 22, 24
See application file for complete search history.

(56) References Cited

U.S. PATENT DOCUMENTS

| 7,979,907 B2* | 7/2011 | Schultz et al. ................. 726/24 |
| 2009/0083855 A1* | 3/2009 | Apap et al. .................... 726/24 |
| 2011/0029805 A1* | 2/2011 | Pericin ............................. 714/2 |
| 2011/0206250 A1* | 8/2011 | McGinnis et al. ............ 382/128 |

OTHER PUBLICATIONS

"Adaptive Model Generation: An Architecture for Deployment of Data Mining-Based Intrusion Detection Systems" Honig et al; Applications of data mining in computer security (Boston: Kluwer, 2002), pp. 153-194. Columbia University.*

* cited by examiner

*Primary Examiner* — Jason Lee
(74) *Attorney, Agent, or Firm* — Edell, Shapiro & Finnan, LLC

(57) ABSTRACT

Binary file analysis is based on a measure of suspiciousness indicating level of doubt as to whether a process executing under control of an operating system machine can access and interpret contents of a binary file safely. Various parameters of a binary file may be classified and identified to construct a set of rules for components therein. Each rule in the set may be assigned a suspiciousness score that indicates a degree of confidence as to whether safe execution of the process on the binary file can be achieved. Analysis is performed while access to the binary file excludes interpreting the contents thereof and indicates a suspicious file when the suspiciousness score meets an established criterion.

12 Claims, 8 Drawing Sheets

```
                                                              325

323                       326      328
<!-DOS Header -->
<entry key="DOS Header Magic Number is Invalid">100</entry>
                                                                  324
                              •
                              •
                              •
<entry key="DOS Header Initial SS Value is Abnormal">100</entry>
<entry key="DOS Header Initial SP is Abnormal">100</entry>
<!-- COFF Header -->
<entry key="COFF Header Optional Header Size is Abnormal">100</entry>
                              •
                              •
                              •
<!-- Resources -->
<entry key="PE Image Contains Embedded Resources which are not Well Known
Types">60</entry>
                              •
                              •
                              •
```

FIG. 3B

| Offset   | 0  | 1  | 2  | 3  | 4  | 5  | 6  | 7  | 8  | 9  | A  | B  | C  | D  | E  | F  | Ascii |
|----------|----|----|----|----|----|----|----|----|----|----|----|----|----|----|----|----|-------|
| 00000000 | 4D | 5A | 90 | 00 | 03 | 00 | 00 | 00 | 04 | 00 | 00 | 00 | FF | FF | 00 | 00 | MZ▮.▮./.▮.ÿÿ.. |
| 00000010 | B8 | 00 | 00 | 00 | 00 | 00 | 00 | 00 | 40 | 00 | 00 | 00 | 00 | 00 | 00 | 00 | ╕......@....... |
| 00000020 | 00 | 00 | 00 | 00 | 00 | 00 | 00 | 00 | 00 | 00 | 00 | 00 | 00 | 00 | 00 | 00 | ................ |
| 00000030 | 00 | 00 | 00 | 00 | 00 | 00 | 00 | 00 | 00 | 00 | 00 | 00 | 00 | 00 | 00 | 00 | ................ |
| 00000040 | 0E | 1F | BA | 0E | 00 | B4 | 09 | CD | 21 | B8 | 01 | 4C | CD | 21 | 54 | 68 | ▮▮º▮.´.Í!▮.LÍ!Th |
| 00000050 | 69 | 73 | 20 | 70 | 72 | 6F | 67 | 72 | 61 | 6D | 20 | 63 | 61 | 6E | 6E | 6F | is program canno |
| 00000060 | 74 | 20 | 62 | 65 | 20 | 72 | 75 | 6E | 20 | 69 | 6E | 20 | 44 | 4F | 53 | 20 | t be run in DOS  |
| 00000070 | 6D | 6F | 64 | 65 | 2E | 0D | 0D | 0A | 24 | 00 | 00 | 00 | 00 | 00 | 00 | 00 | mode...$....... |
| 00000080 | 50 | 45 | 00 | 00 | 4C | 01 | 03 | 00 | EA | D2 | A6 | 4B | 00 | 00 | 00 | 00 | PE..L▮..êÒ¦K.... |
| 00000090 | 00 | 00 | 00 | 00 | E0 | 00 | 02 | 01 | 0B | 01 | 08 | 00 | 00 | 20 | 1C | 00 | ....à.▮▮▮▮....▮. |
| 000000A0 | 00 | F0 | 02 | 00 | 00 | 00 | 00 | 00 | 3E | 34 | 1C | 00 | 00 | 20 | 00 | 00 | .ð▮.....>4▮..... |
| 000000B0 | 00 | 40 | 1C | 00 | 00 | 00 | 40 | 00 | 00 | 20 | 00 | 00 | 00 | 10 | 00 | 00 | .@▮...@.......▮. |
| 000000C0 | 04 | 00 | 00 | 00 | 00 | 00 | 00 | 00 | 04 | 00 | 00 | 00 | 00 | 00 | 00 | 00 | ▮.......▮....... |
| 000000D0 | 00 | 40 | 1F | 00 | 00 | 10 | 00 | 00 | 00 | 00 | 00 | 00 | 02 | 00 | 40 | 85 | .@▮..▮......▮.@. |
| 000000E0 | 00 | 00 | 10 | 00 | 00 | 10 | 00 | 00 | 00 | 00 | 10 | 00 | 00 | 10 | 00 | 00 | ..▮..▮....▮..▮.. |
| 000000F0 | 00 | 00 | 00 | 00 | 10 | 00 | 00 | 00 | 00 | 00 | 00 | 00 | 00 | 00 | 00 | 00 | ....▮........... |
| 00000100 | E8 | 33 | 1C | 00 | 53 | 00 | 00 | 00 | 40 | 1C | 00 | 28 | D6 | 02 | 00 | 00 | è3▮.S...@▮.(Ö▮.. |
| 00000110 | 00 | 00 | 00 | 00 | 00 | 00 | 00 | 00 | 00 | 00 | 00 | 00 | 00 | 00 | 00 | 00 | ................ |
| 00000120 | 00 | 20 | 1F | 00 | 0C | 00 | 00 | 00 | 30 | 33 | 1C | 00 | 1C | 00 | 00 | 00 | .▮.▮...03▮.▮.... |
| 00000130 | 00 | 00 | 00 | 00 | 00 | 00 | 00 | 00 | 00 | 00 | 00 | 00 | 00 | 00 | 00 | 00 | ................ |
| 00000140 | 00 | 00 | 00 | 00 | 00 | 00 | 00 | 00 | 00 | 00 | 00 | 00 | 00 | 00 | 00 | 00 | ................ |
| 00000150 | 00 | 00 | 00 | 00 | 00 | 00 | 00 | 00 | 00 | 20 | 00 | 00 | 08 | 00 | 00 | 00 | .........▮...... |
| 00000160 | 00 | 00 | 00 | 00 | 00 | 00 | 00 | 00 | 08 | 20 | 00 | 00 | 48 | 00 | 00 | 00 | .........▮..H... |
| 00000170 | 00 | 00 | 00 | 00 | 00 | 00 | 00 | 00 | 2E | 74 | 65 | 78 | 74 | 00 | 00 | 00 | ........ text... |
| 00000180 | 44 | 14 | 1C | 00 | 00 | 20 | 00 | 00 | 00 | 20 | 1C | 00 | 00 | 10 | 00 | 00 | D▮▮......▮....▮. |
| 00000190 | 00 | 00 | 00 | 00 | 00 | 00 | 00 | 00 | 00 | 00 | 00 | 00 | 20 | 00 | 00 | 60 | ............▮..` |
| 000001A0 | 2E | 72 | 73 | 72 | 63 | 00 | 00 | 00 | 28 | D6 | 02 | 00 | 00 | 40 | 1C | 00 | .rsrc...(Ö▮..@▮. |
| 000001B0 | 00 | E0 | 02 | 00 | 00 | 30 | 1C | 00 | 00 | 00 | 00 | 00 | 00 | 00 | 00 | 00 | .à▮..0▮......... |
| 000001C0 | 00 | 00 | 00 | 00 | 40 | 00 | 00 | 40 | 2E | 72 | 65 | 6C | 6F | 63 | 00 | 00 | ....@..@.reloc.. |
| 000001D0 | 0C | 00 | 00 | 00 | 00 | 20 | 1F | 00 | 00 | 10 | 00 | 00 | 00 | 10 | 1F | 00 | ▮....▮▮...▮...▮▮. |
| 000001E0 | 00 | 00 | 00 | 00 | 00 | 00 | 00 | 00 | 00 | 00 | 00 | 00 | 40 | 00 | 00 | 42 | ............@..B |
| 000001F0 | 00 | 00 | 00 | 00 | 00 | 00 | 00 | 00 | 00 | 00 | 00 | 00 | 00 | 00 | 00 | 00 | ................ |
| 00000200 | 00 | 00 | 00 | 00 | 00 | 00 | 00 | 00 | 00 | 00 | 00 | 00 | 00 | 00 | 00 | 00 | ................ |
| 00000210 | 00 | 00 | 00 | 00 | 00 | 00 | 00 | 00 | 00 | 00 | 00 | 00 | 00 | 00 | 00 | 00 | ................ |
| 00000220 | 00 | 00 | 00 | 00 | 00 | 00 | 00 | 00 | 00 | 00 | 00 | 00 | 00 | 00 | 00 | 00 | ................ |
| 00000230 | 00 | 00 | 00 | 00 | 00 | 00 | 00 | 00 | 00 | 00 | 00 | 00 | 00 | 00 | 00 | 00 | ................ |
| 00000240 | 00 | 00 | 00 | 00 | 00 | 00 | 00 | 00 | 00 | 00 | 00 | 00 | 00 | 00 | 00 | 00 | ................ |
| 00000250 | 00 | 00 | 00 | 00 | 00 | 00 | 00 | 00 | 00 | 00 | 00 | 00 | 00 | 00 | 00 | 00 | ................ |
| 00000260 | 00 | 00 | 00 | 00 | 00 | 00 | 00 | 00 | 00 | 00 | 00 | 00 | 00 | 00 | 00 | 00 | ................ |
| 00000270 | 00 | 00 | 00 | 00 | 00 | 00 | 00 | 00 | 00 | 00 | 00 | 00 | 00 | 00 | 00 | 00 | ................ |
| 00000280 | 00 | 00 | 00 | 00 | 00 | 00 | 00 | 00 | 00 | 00 | 00 | 00 | 00 | 00 | 00 | 00 | ................ |
| 00000290 | 00 | 00 | 00 | 00 | 00 | 00 | 00 | 00 | 00 | 00 | 00 | 00 | 00 | 00 | 00 | 00 | ................ |
| 000002A0 | 00 | 00 | 00 | 00 | 00 | 00 | 00 | 00 | 00 | 00 | 00 | 00 | 00 | 00 | 00 | 00 | ................ |
| 000002B0 | 00 | 00 | 00 | 00 | 00 | 00 | 00 | 00 | 00 | 00 | 00 | 00 | 00 | 00 | 00 | 00 | ................ |
| 000002C0 | 00 | 00 | 00 | 00 | 00 | 00 | 00 | 00 | 00 | 00 | 00 | 00 | 00 | 00 | 00 | 00 | ................ |
| 000002D0 | 00 | 00 | 00 | 00 | 00 | 00 | 00 | 00 | 00 | 00 | 00 | 00 | 00 | 00 | 00 | 00 | ................ |
| 000002E0 | 00 | 00 | 00 | 00 | 00 | 00 | 00 | 00 | 00 | 00 | 00 | 00 | 00 | 00 | 00 | 00 | ................ |
| 000002F0 | 00 | 00 | 00 | 00 | 00 | 00 | 00 | 00 | 00 | 00 | 00 | 00 | 00 | 00 | 00 | 00 | ................ |

FIG. 4A

ANALYSIS OF BINARY CODE

RELATED APPLICATION DATA

This application claims the benefit of U.S. Provisional Patent Application 61/406,738, filed on Oct. 26, 2010, the disclosure of which is incorporated herein by reference in its entirety.

FIELD OF THE INVENTION

Embodiments of the present invention relate to analysis of computer files, and more particularly to systems and methods that can identify suspicious binary code.

BACKGROUND OF THE INVENTION

Computer hacking, Malware, worms, and other computer related mischief undertaken or caused by people with either benign or malicious intent is of grave concern to businesses, particularly those that rely on expansive computer networks. Indeed, a breach of an organization's network, including even a single computer on that network, may result in direct and indirect financial loss, the latter including loss associated with legal fees, fines, etc. In certain cases, such as when the computer controls industrial processes, harm caused by malicious code may be physical. In other cases where physical harm is remote, emotional and or financial harm may come to the user through loss of critical data and/or by revealing private data to a third party.

Malware, computer viruses and the like are often propagated via one or more computer files. Typically, computer users obtain computer program files in the form of binary code, e.g., compiled source code. Unless the computer user is a programmer himself, it is rare that the source code of a given program is available to determine whether the code is malicious in nature.

One way to analyze binary code (or executable code) is to launch the executable code in a "sandbox" that is, essentially, an instance of an operating system that is executed for the sole purpose of running the binary code to be analyzed. Using such an approach, even if a given executable program in the form of binary code is malicious, there are no data or other programs that can be impacted because, in the sandbox approach, the operating system is not supporting any other user functionality. Although, the sandbox approach has certain advantages, it may be difficult, in a practical situation to subject every piece of binary code to such a test. In any event, some malicious software might include code that does not actually perform malicious actions for days or even weeks. Accordingly, the sandbox approach has limitations.

There is therefore a need to provide tools for examining and analyzing binary code in an effort to identify potentially malicious software.

SUMMARY

Described herein is a technique applicable to binary file analysis. A set of rules for fields in a binary file is established and each rule in the set has an associated suspiciousness score that indicates the potential for adverse operation of a computer should a target process interpret the contents of a corresponding field. The contents of a field are retrieved in a manner that excludes transfer of control of the computer in response to the interpretation the contents. The retrieved contents may be evaluated against the set of rules for the corresponding field to determine the suspiciousness score therefor and the binary file may be reported as suspicious if the suspiciousness score meets an established criterion.

The above and still further features and advantages of the present inventive concept will become apparent upon consideration of the following definitions, descriptions and descriptive figures of specific embodiments thereof. While these descriptions go into specific details of certain embodiments of the inventive concept, it is to be understood that variations may and do exist and will be apparent to those skilled in the art upon review of this disclosure.

BRIEF DESCRIPTION OF THE DRAWINGS

FIG. 3B is a diagram of a rules table against which a binary file may be analyzed by embodiments of the present invention;

FIGS. 4A-4B depict, respectively, a normal binary file and a malicious binary file with a header that has been modified and that can be analyzed, and determined to be malicious in nature, by embodiments of the present general inventive concept;

DETAILED DESCRIPTION

Figure 1:
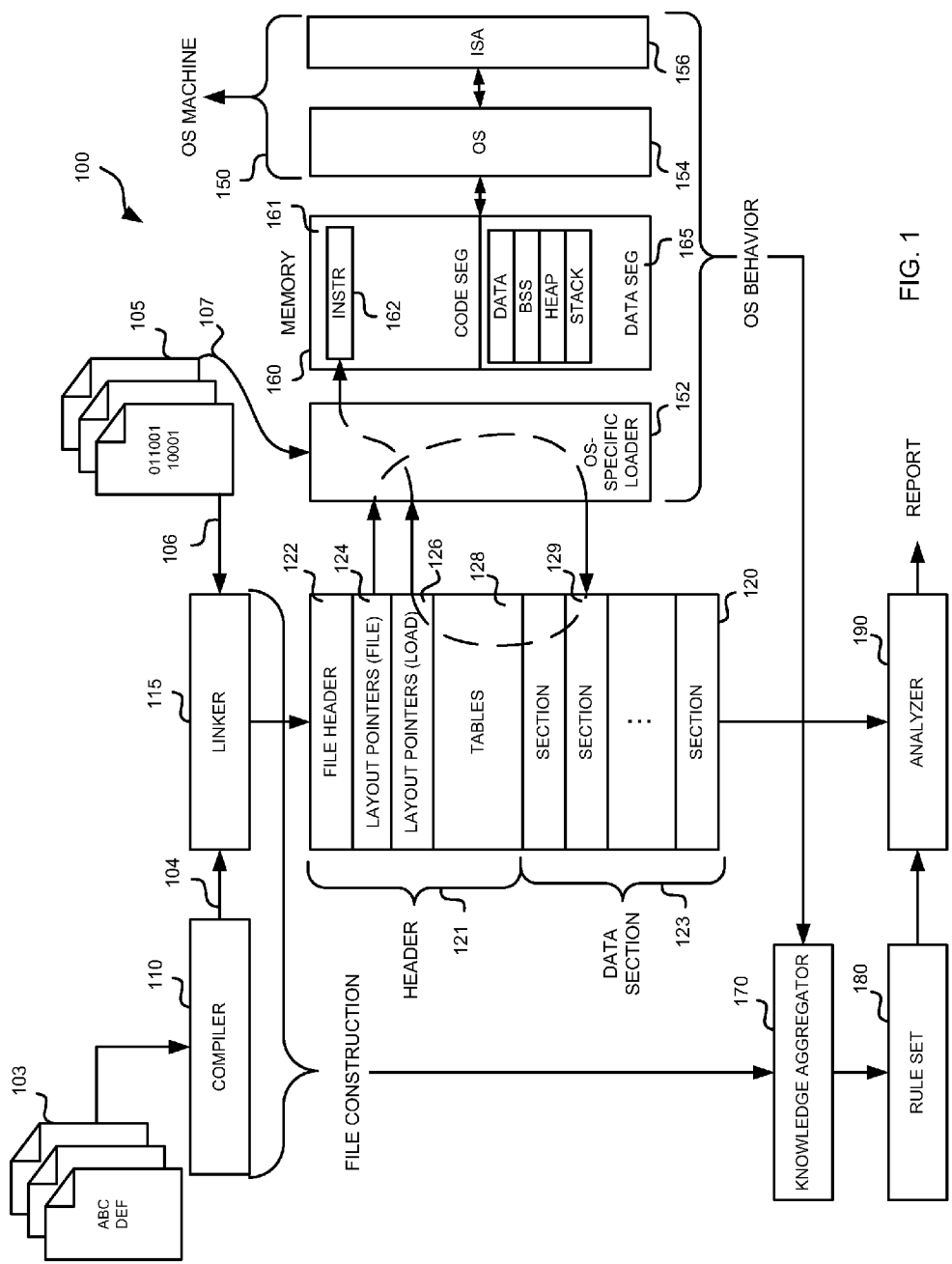
FIG. 1 is a schematic block diagram of a computer system in the context of binary file analysis by which the present general inventive concept may be embodied.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Figure 5A:
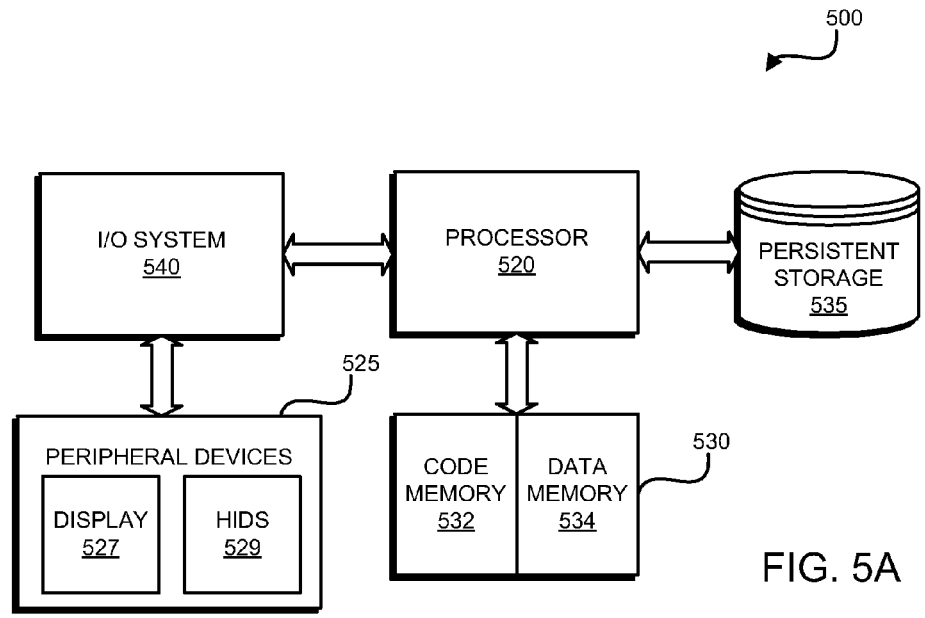
FIGS. 5A-5B are schematic block diagrams of system configurations by which the present general inventive concept may be embodied.
Figure 5B:
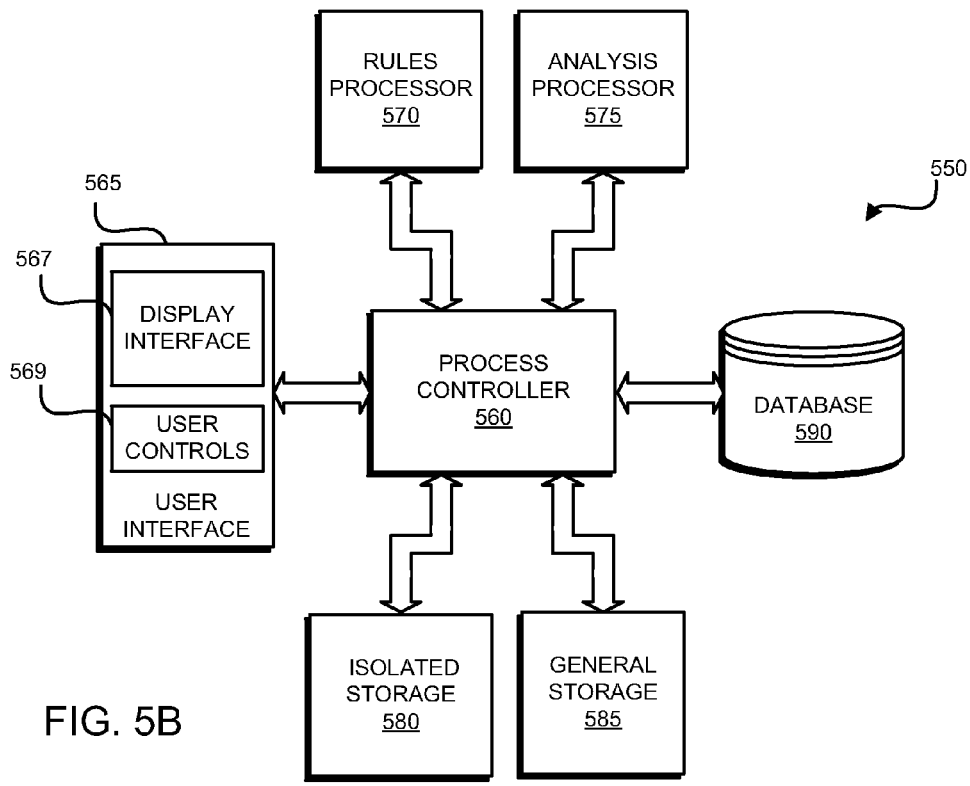

In FIG. 1, a computer 100 is illustrated and is defined by a combination of hardware, such as the system of FIG. 5A, and the processes executing on such hardware, such as those exemplified in FIG. 5B. The core of exemplary computer 100 comprises an operating system machine 150 and digital memory 160. As used herein, an operating system machine (OSM) refers to computing hardware and services through which software applications or, more aptly, programmed instruction sets execute on a computer and interoperate with other such applications.

OSM 150 can be viewed as a hierarchy of layers, the lowest layer of which may be instruction set architecture (ISA) 156. ISA 156 forms a portion of the computer architecture that is outside the specific processor circuitry, but through which the processor circuitry can be programmed. ISA 156 implements, for example, native data types, instructions, registers, addressing modes, memory architecture, interrupt and exception handling, and external input/output (I/O). Additionally, ISA 156 may implement a specific set of opcodes, i.e., machine language, and the native commands implemented by the particular processor circuitry.

The next higher layer in OSM 150 is operating system (OS) 154, which, as the ordinarily skilled artisan will recognize, can be viewed as a hierarchical abstraction that removes low-level implementation details of the underlying ISA 156 from higher-level processes, such as executable applications. To that end, OS 154 may include a hardware abstraction layer that provides a standard interface to ISA 156, whereby compatibility for applications is managed at the level of OS 154 as opposed to the level of ISA 156. Additionally, OS 154 may implement a kernel to, among other things, allocate memory, manage resources and provide standard services callable by applications, such as file and peripheral device access. The present invention is not limited to a particular OSM and the ordinarily skilled artisan will recognize numerous analogous systems by which computer 100 can be implemented. Further, those skilled in the art will possess an understanding of instruction set architecture and operating systems, at least to the extent sufficient to understand the present invention from reviewing this disclosure; implementation details of such will therefore be omitted. Exemplary OSM 150 is explicitly illustrated in FIG. 1 and described with reference thereto solely for providing context by which the general inventive concept can be explained. However, it is to be appreciated that OSM 150, and analogous systems as well, expect certain data in a particular format and with expected content to function properly. It is to be appreciated as well that a lack of conformity of such data to format and content constraints on the OS layer can result in operations that are potentially harmful to the computer or, more aptly, the computer's user. Malicious software creators leverage knowledge of the expectations and functionality of OSM 150 to effectively bypass the abstraction hierarchy to any level thereof, including to ISA 156.

In FIG. 1, an exemplary binary file 120 is illustrated, which, by definition, is a computer-readable data structure containing binary digits. In the realm of digital computers, this definition fits essentially all data stored in a digital data storage device. However, unpredictable or damaging behavior of a computer occurs only when such data is loaded into a segment of memory and accessed thereat by one or more executing processes. Accordingly, OSM 150 must know the location of one or more fields in the binary file 120. Thus, binary files that are of most concern fit a narrower definition: a computer-readable data structure that contains at least one data field, the location of which is known by at least one process executing on a computer. It is to be understood, however, that the present invention is not limited to any particular file structure; the ordinarily skilled artisan will recognize and appreciate how exemplary binary file 120 is analogous to other binary file types. The scope of the present invention is intended to encompass such alternative file types and associated computer-executable processes.

The format and content of binary file 120 is governed by a set of rules governed by standard OS behavior, typically by way of a specification. However, binary file 120 can conform to, say, format specifications and yet carry content that, when interpreted by a target process, may cause the execution of harmful operations. As used herein, the term interpret refers to identifying a data type of a binary data field and executing an action on the contents of the data field in accordance with the data type. It is to be understood that the term interpret is not to be confused with the functionality of an interpreter, which executes instructions of a computer program written in an interpreted programming language, such as BASIC. By way of interpretation, as the term is used herein, a process may identify a data field as that containing, say, an address and may transfer control of a computer to an instruction at that address. As another example, a process may identify a data field as that containing an executable instruction and may execute the contents of the data field as such an instruction. In yet another example, a process may identify a data field as that containing an indication of a target process for the binary file, such as through a file type identifier or "magic number," and transfer access control thereof to the target process. The ordinarily skilled artisan will recognize numerous operations fitting the definition of interpretation, as used herein, and the scope of the present invention is intended to embrace all such alternatives.

As used herein, a rule is a specification of the format and content of a binary file, any field in that binary file and any subfields in the field, and so on. A rule violation refers to its literal meaning, i.e., a violation of a format or content specification. A rule discrepancy, however, is loose adherence to the afore-mentioned specification that, although may not rise to the level of a violation, could potentially do harm depending on the nature of the discrepancy. Since all rule violations are rule discrepancies, both violations and discrepancies will be referred to herein as rule discrepancies unless otherwise noted.

Rule discrepancies can be characterized by a descriptor indicating the nature of the discrepancy and a score indicating a likelihood that such a discrepancy would cause harmful or unpredictable computer operations. As an example, assume that a rule exists defining format and content of a particular field in header 121 of binary file 120. A discrepancy may be encountered if, say, an address is expected to be in the field, per the specification, but the value contained in the field is suspected to be out of range. Accordingly, a rule discrepancy descriptor may be, "Expected address value out of normal range." The associated score may be selected to indicate that, if the address is indeed out of range, then there is high degree of confidence that, if the value were to be interpreted as an address that is expected to be in that field, abnormal behavior would result.

Figure 3A:
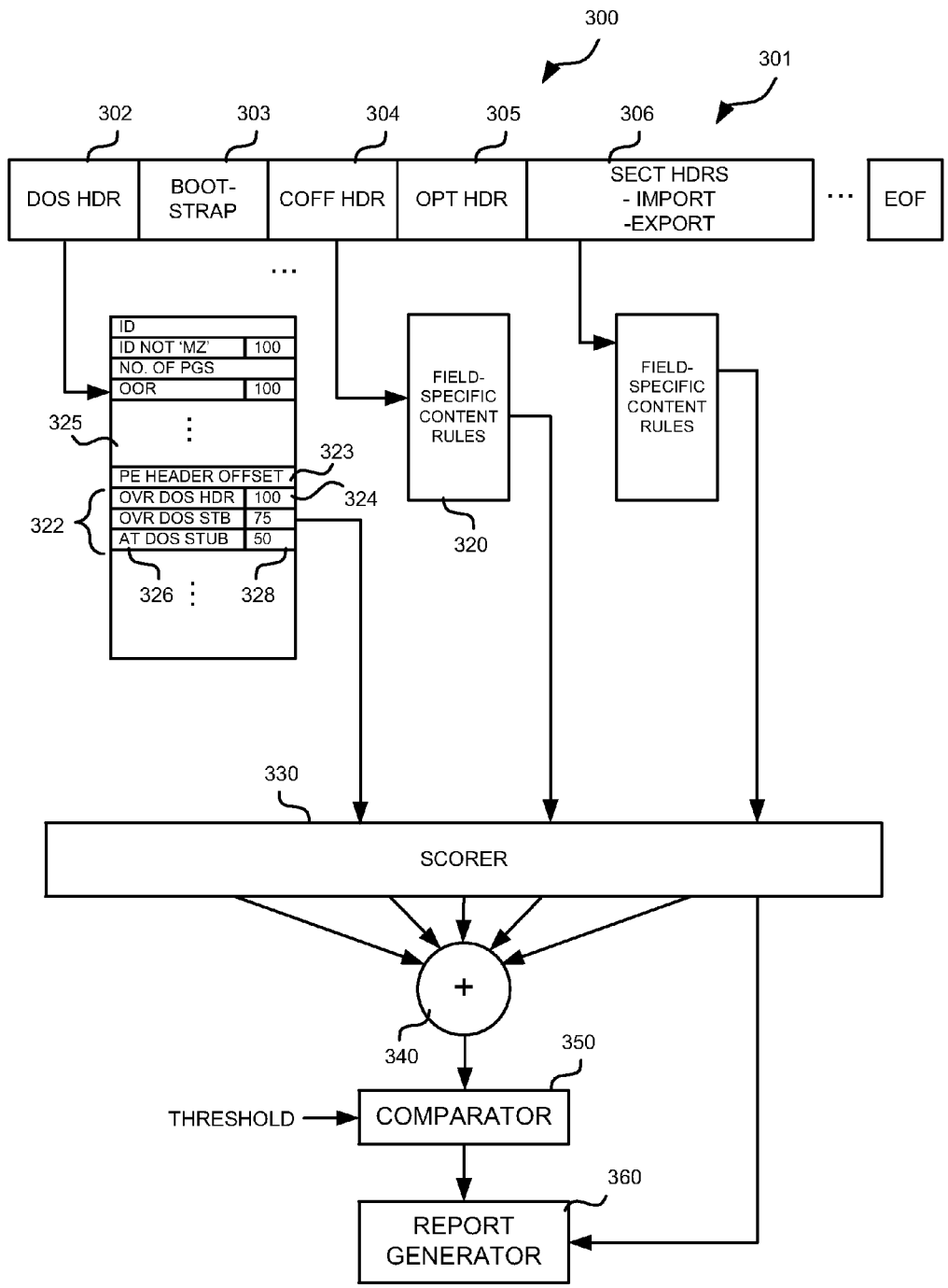
FIG. 3A depicts a binary file analyzer by which the present general inventive concept may be embodied.

Without loss of generality or limitation to the scope of the present invention, it is to be assumed that binary file 120 is an executable file constructed by way of a compiler 110 and a linker 115 conforming to the requirements of such by OSM 150. Compiler 110 may generate object code, indicated at 104, from source code files 103. Other object code, libraries, etc., indicated by files 105, can be linked with the output of compiler 110, as indicated at 106, to produce binary file 120. Compiling and linking processes are well known to those skilled in the art and will not be described in detail herein. However, it should be appreciated that the output of compiler 110 and linker 115 are generated in a standardized manner. For example, a portable executable (PE) binary file format, a standardized format for the MICROSOFT WINDOWS operating system is illustrated in FIG. 3A. Rules governing the content and layout of binary file 120 are known through standards and such standards may be used to construct a rule set by which binary file 120 may be analyzed. It is to be understood that standardized file structures other than those produced by a compiler 110 and linker 115 may be used in conjunction with the present invention without deviating from the spirit and intended scope thereof.

Exemplary file 120 includes a header 121 and a data section 123. Header 121 may include one or more fields, the location of at least one of which is known by a process executing on a computer. Such fields may include file header 122, which may contain file specific information, layout information 124, 126, which may contain information specifying the construction of file 120 and how file 120 is to be placed into memory, and fields 128 in which various tables are stored, such as, for example, relocation tables, symbol tables, segment tables, resource tables, import tables, reference tables, and other such tables known in the art. Binary file 120 may have information such as that in exemplary header 121 distributed throughout the file; however, for purposes of description, it is to be assumed that all such information is contained in header 121. Further, it is to be understood that the presence, content and location of these and other data fields are highly variable across the wide variety of known binary file types, and specific details will not be provided herein except where discussion of such details forwards a thorough understanding and appreciation of the present invention by those skilled in the computer arts.

Data section 123 may contain data that are persistently maintained in file 120. Such data may include static data, variable data and sets of computer-executable instructions. Data section 123 may be portioned into multiple sections 129 so as to facilitate transfer of the corresponding data to different locations in memory 160. In general, data section 120 may be altered by a user, although usually not directly, but header 121 is typically modified only with designated authority, such as by a target process on OSM 150, and is not directly manipulated by a user unless the user is circumventing standard operations on the file 120.

Various processes of OSM 150 and those executing under control of OSM 150 may utilize binary file 120 by interpreting the contents thereof. An apt exemplary process of OSM 150 is that of loader 152. Exemplary loader 152 positions the data contained in binary file 120 into memory 160 in accordance with the binary data contained in the various fields of binary file 120. Additionally, loader 152 may position dynamically linked object code and libraries, as is indicated by arrow 107, as required by the executable program defined by binary file 120 in a similar manner. Such dynamically linked libraries may be relied upon for implementing functionality of the executable defined by file 120. As such, the content and format rules of file 120 may include specifications regarding proper importing of the code in the dynamically linked libraries.

As illustrated in FIG. 1, loader 152 may access file header 122 to determine locations of data fields required for proper loading of binary file 120 into memory 160. By way of the retrieval of the data from header 122, loader 152 may access, for example, data field 124 and retrieve therefrom an address of a data section 129 to load into memory 160. Data section 129 may be loaded into a code segment 161 of memory 160 upon a determination that section 129 contains processor instructions. Alternatively, data section 129 may be loaded into data segment 165 on a determination that data section 129 contains non-executable data such as constants and initialized and/or uninitialized variables. Such determination may be made by examination of certain fields in binary file 120 that specify the layout and content thereof, as opposed to direct examination of the data in section 129. Loader 152 may also access data field 126 and retrieve therefrom an address of memory 160, direct or indirect, at which data section 129 is loaded. Loader 152 may retrieve data section 129 from binary file 120 in accordance with the address retrieved from data field 124 and position the data in section 129 in memory 160 in accordance with the address retrieved from data field 126. In the example illustrated in FIG. 1, the data contained in data section 129 is positioned into code segment 161 and the data in section 129 is treated as processing instructions by OSM 150, as illustrated at instruction 162. Once loaded, OSM 150 can launch the program defined in binary file 120 at the entry point defined in specifications associated therewith.

The foregoing summary of operation of loader 152 is provided solely as an example of a process under control of OSM 150 for which the content and layout of a binary file 120 is specified. The operations of loader process described above can be extended to other processes and should be readily recognized by the ordinarily skilled artisan. The present invention is not limited to particular processes and the manner in which a particular OSM 150 would execute and control such processes. However, it should be appreciated that for a given OSM 150, such processes are executed and controlled in a standardized manner.

Various parameters regarding the construction of a particular binary file 120 may be assembled by a knowledge aggregator 170. As illustrated in FIG. 1, such parameters may be gathered from specifications establishing the manner in which binary file 120 is constructed by a particular source process, such as by compiler 110 and linker 115. Such parameters may be refined and/or augmented by knowledge of processes that may be performed on binary file 120 by OSM 150. The parameters and the specifications for such may be collected, identified, categorized, etc., by knowledge aggregator 170 to assemble a set of rules 180 against which an analyzer 190 determines whether binary file 120 is to be considered suspicious, as will be described in detail below.

Figure 2:
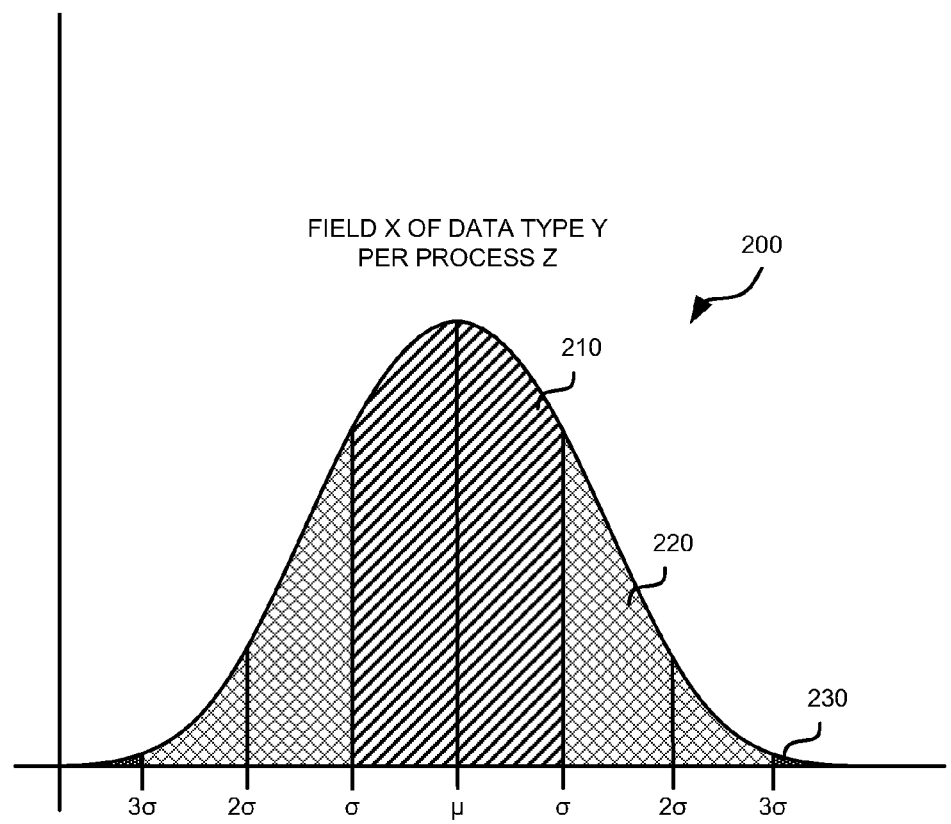
FIG. 2 is a diagram of a probability distribution by which a binary file may be analyzed by embodiments of the present general inventive concept.

Certain embodiments construct a complete rule set for a given binary file type from not only the specification for such, but also from statistical analyses that determines what may be "normal," or, more aptly, what may be "abnormal," is defined. Knowledge aggregator 170 may collect a statistically sufficient number of samples of values from any given data field in binary file 120 to generate a probability density function (PDF) 200, as illustrated in FIG. 2. Exemplary PDF 200 is a distribution of binary values expected by a process Z in field X of binary file 120. That is, process Z expects a particular data type Y in field X and there is a range of values that can be interpreted as data type Y by process Z with predictable results. For example, if field X was to indicate a location in file 120, the data type Y of field X would be an address and the contents of field X expected by process Z would be a valid offset value from a known location in file 120. From knowledge of how process Z would interpret binary data in field X of file 120, and a statistically significant number of samples of such values, PDF 200 can be estimated. Data values in regions of PDF 200 within a predetermined deviation from its expected value, p, such as is indicated at region 210, may be considered normal, those in region 230 may be considered abnormal, and those in region 220 may be considered suspect, but not abnormal.

Alternatively, PDF 200 may represent a distribution of what is considered abnormal. For example, PDF 200 may be generated from a statistically significant number of samples of cases where the content of the corresponding data field resulted in harmful or unpredictable behavior upon being interpreted by a target process. That is, region 210 of PDF 200 may indicate values that are known to have resulted in abnormal behavior. The present invention is not limited to particular statistical analyses for constructing rule set 180. However, it should be appreciated that a particular goal of such analyses is to be able to indicate a degree of confidence that a particular data value in a particular data field of a binary file in a particular binary file format might result in harmful or unpredictable behavior if interpreted by a particular process in accordance with what the data purports to be.

From knowledge aggregations and statistical analyses, a set of rules and rule discrepancies may be generated. For example, a rule may be defined that specifies a specific file offset address in a data field of file header 122. A set of discrepancies of the rule may be constructed in accordance with known acceptable ranges of offset values, the expected and actual contents of file 120 at the offset value, statistically abnormal offset values, etc. As used herein, statistical abnormality refers to binary file content that statistically deviates from the mean by an amount selected in accordance with the data being scrutinized and with the analyses being performed. For example, statistical abnormality may be where a binary value in the corresponding data field is extraordinary, e.g., is one that has been encountered a small number of times in a large number of samples. Another statistical abnormality may be that where, from analyzing a large number of samples, a particular data pattern is known to have resulted in harmful or unpredictable computer behavior. The categorization and statistical analysis to establish what is normal and what is abnormal with regard to a given rule can be arbitrarily, but prudently chosen on an implementation basis.

As stated above, a rule discrepancy may be associated with a score, referred to herein as a suspiciousness score, indicating a likelihood that the discrepancy would cause harmful or unpredictable computer operations. The actual values used in the suspiciousness score can arranged in accordance with an arbitrary scale, from, say, zero (0) indicating likely not harmful to one hundred (100) indicating a high likelihood of harmful behavior. In certain embodiments, the scale of suspiciousness scores can be established through knowledge of standards, statistical analysis and empirical findings to indicate a level of "safety," e.g., a binary file with a low suspiciousness score may be considered safer than a binary file with a higher suspiciousness score.

In certain embodiments, discrepancy descriptors may indicate merely that a value in a data field can be considered, "abnormal," and the corresponding suspiciousness score would indicate a severity of abnormality. When so embodied, a value in field X may be analyzed and found abnormal per, for example, PDF 200. The corresponding suspiciousness score may indicate in what region of PDF 200 the value falls. Certain embodiments of the present invention may construct a rule set that assigns a low suspiciousness score to values in region 210, a higher suspiciousness score to region 220 and suspiciousness scores for values in region 230 that would indicate of a high level of confidence that a value is not what would be expected in field X by processes Z.

Exemplary analyzer 190 applies rules set 180 on binary file 120 to determine a level of suspiciousness as to whether executing a target process on file 120 can be done safely, i.e., without harm, directly or indirectly, to a user of the computer. In FIG. 3, an exemplary analyzer 300 is illustrated that may perform the functions of analyzer 190. However, it is to be understood that other analysis and scoring schemes can be used in conjunction with the present invention without deviating from the spirit and overall scope thereof.

In the example of FIG. 3A, a DOS executable binary file 301 includes a plurality of fields 302-306. It is to be understood that each of the fields 302-306 may include subfields. For example, DOS header 302 includes such fields as a magic number field, a number of relocation entries stored after the header field, a stack pointer register initial value field, and other fields as is well known in the art. For each field 302-306 of binary file 301, a set of field specific content rules 320 is established by, for example, knowledge aggregator 170. Each field and/or subfields has associated therewith a set of rules 323. Each rule 323 includes a set 322 of discrepancies 324, each including a discrepancy descriptor 326 and an associated suspiciousness score 328. The discrepancy descriptor 326 indicates the manner in which adherence to the rule is suspect and the suspiciousness score 328 identifies the seriousness of the rule discrepancy indicated by descriptor 326.

Each field 302-306 of binary file 301 may be retrieved, such as by a parser, from an isolated memory, i.e., a segment in memory wherein the interpretation of data in data file 301 is prohibited. It is to be understood however that each field 302-306 may be independently retrieved and examined separately, and even concurrently, with the examination of other fields 302-306 of binary file 301. Each field 302-306 may be evaluated against a corresponding set of rules contained in a data structure, such as a lookup table 325, to determine whether a data value in the field has a discrepancy corresponding to an entry therein. A more detailed view of such a lookup table 325 is illustrated in FIG. 3B and the following is an exemplary content listing of lookup table 325 for a PE file:

<!-DOS Header->
<entry key="DOS Header Magic Number is Invalid">100</entry>
<entry key="DOS Header Bytes on Last Page is Abnormal">100</entry>
<entry key="DOS Header Pages in File is Abnormal">100</entry>
<entry key="DOS Header Number of Relocations is Abnormal">100</entry>
<entry key="DOS Header Size of Header Paragraphs Needed is Abnormal">100</entry>
<entry key="DOS Header Minimum Extra Paragraphs Needed is Abnormal">100</entry>
<entry key="DOS Header Maximum Extra Paragraphs Needed is Abnormal">100</entry>
<entry key="DOS Header Initial SS Value is Abnormal">100</entry>
<entry key="DOS Header Initial SP is Abnormal">100</entry>
<entry key="DOS Header Checksum is Abnormal">100</entry>
<entry key="DOS Header Initial IP is Abnormal">100</entry>
<entry key="DOS Header Relative CS is Abnormal">100</entry>
<entry key="DOS Header Overlay Number is Abnormal">50</entry>
<entry key="DOS Header Overlay Number NonZero is Abnormal">100</entry>
<entry key="DOS Header Reserved Entry 0 is Abnormal">100</entry>
<entry key="DOS Header Reserved Entry 1 is Abnormal">100</entry>
<entry key="DOS Header Reserved Entry 2 is Abnormal">100</entry>
<entry key="DOS Header Reserved Entry 3 is Abnormal">100</entry>
<entry key="DOS Header OEM Identifier is Abnormal">100</entry>
<entry key="DOS Header OEM Info is Abnormal">100</entry>
<entry key="DOS Header Reserved 2 Entry 0 is Abnormal">100</entry>
<entry key="DOS Header Reserved 2 Entry 1 is Abnormal">100</entry>
<entry key="DOS Header Reserved 2 Entry 2 is Abnormal">100</entry>
<entry key="DOS Header Reserved 2 Entry 3 is Abnormal">100</entry>
<entry key="DOS Header Reserved 2 Entry 4 is Abnormal">100</entry>

```xml
<entry key="DOS Header Reserved 2 Entry 5 is Abnormal">100</entry>
<entry key="DOS Header Reserved 2 Entry 6 is Abnormal">100</entry>
<entry key="DOS Header Reserved 2 Entry 7 is Abnormal">100</entry>
<entry key="DOS Header Reserved 2 Entry 8 is Abnormal">100</entry>
<entry key="DOS Header Reserved 2 Entry 9 is Abnormal">100</entry>
<entry key="DOS Header PE Header Offset Overlaps DOS Header">100</entry>
<entry key="DOS Header PE Header Offset Overlaps DOS Stub">75</entry>
<entry key="DOS Header PE Header Offset Starts at DOS Stub">50</entry>
<entry key="DOS Header PE Header Offset is Abnormally High">25</entry>
<!--COFF Header-->
<entry key="COFF Header Optional Header Size is Abnormal">100</entry>
<entry key="COFF Header Number Symbols is Abnormal">10</entry>
<entry key="COFF Header Time Stamp is Abnormal">25</entry>
<!--Optional Header-->
<entry key="Optional Header Major and Minor Versions are Set to Zero">100</entry>
<entry key="Optional Header Major Linker Version is Zero with Non-Zero Minor Version">90</entry>
<entry key="Optional Header Major Linker Version Number Abnormally High">70</entry>
<entry key="Optional Header Minor Linker Version Version Number Abnormally High">70</entry>
<entry key="Optional Header File Alignment is Abnormal">50</entry>
<entry key="Optional Header Section Alignment is Abnormal">50</entry>
<entry key="Optional Header Loader Flags is Abnormal">85</entry>
<entry key="Optional Header Major OS Version is Abnormal">70</entry>
<entry key="Optional Header Minor OS Version is Abnormal">60</entry>
<entry key="Optional Header RVA Number and Sizes is Abnormal">60</entry>
<entry key="Optional Header Size of Headers is Abnormal">50</entry>
<entry key="Optional Header Major Subsystem Version is Abnormal">60</entry>
<!--Resources-->
<entry key="PE Image Contains Embedded Resources which are not Well Known Types">60</entry>
<!--Export Directories-->
<entry key="PE Image Exports Functions with Known Bad Fingerprints">90</entry>
<entry key="PE Image Exports Functions with Known Bad Patterns">50</entry>
<entry key="PE Image Exports Functions with Unusual Name Lengths">25</entry>
<!--Import Directories-->
<entry key="PE Image Imports Functions with Known Bad Patterns">25</entry>
<entry key="PE Image Imports Functions with Known Bad Fingerprints">90</entry>
<entry key="PE Image Imports Functions with Suspicious Fingerprints">60</entry>
<entry key="PE Image Imports Functions with Watchlisted Fingerprints">30</entry>
<entry key="PE Image Imports Functions with Unusual Name Lengths">15</entry>
<!--Sections-->
<entry key="PE Image Contains Sections Not Well Known and Marked as Write/Executable">85</entry>
<entry key="PE Image Contains Sections Not Well Known">50</entry>
<entry key="PE Image Does Not Contains a Code Section">85</entry>
<entry key="PE Image Does Not Contains a Section Marked as Executable">100</entry>
<entry key="PE Image has an Address of Entry Point Which Does Not point to a Code Section">90</entry>
<entry key="PE Image has an Address of Entry Point Which Does Not point to an Executable Section">90</entry>
<entry key="PE Image has an Address of Entry Point Which Does Not point to valid Section">10</entry>
<entry key="PE Image Contains Multiple uncommon Sections">85</entry>
<!--Others-->
<entry key="PE Image Contains Embedded Executables in Resource Table">100</entry>
<entry key="PE Image Contains Embedded Executables in Payload Data Following End of Image">200</entry>
<entry key="PE Image Contains Payload Data Following End of Image">10</entry>
<entry key="PE Image Checksum is Invalid">100</entry>
<entry key="PE Image Contains Compressed Sections">100</entry>
<entry key="PE Image Not Properly Versioned with Product Name">5</entry>
<entry key="PE Image Not Properly Versioned with Company Name">5</entry>
<entry key="PE Image Not Properly Versioned with File Version">5</entry>
<entry key="PE Image Not Properly Versioned with File Description">1</entry>
<entry key="PE Image Not Properly Versioned with Legal Copyright">1</entry>
<entry key="PE Image Not Properly Versioned with Comments">1</entry>
<entry key="PE Image Not Properly Versioned with Internal Name">1</entry>
<entry key="PE Image Not Properly Versioned with Legal Trademarks">1</entry>
<entry key="PE Image Not Properly Versioned with Original Filename">1</entry>
<entry key="PE Image Not Properly Versioned with PrivateBuild">1</entry>
<entry key="PE Image Not Properly Versioned with ProductVersion">1</entry>
<entry key="PE Image Not Properly Versioned with SpecialBuild">1</entry>
<entry key="PE Image is Non-EXE (Address of Entry Point set to Zero)">-1000</entry>.
```

Upon such recognition of a rule discrepancy, the discrepancy descriptor 326 and the associated suspiciousness score 328 may be provided to a scorer 330. The scores associated with any field-specific discrepancy in any of the fields 302-306 may be accumulated by an accumulator 340 and the accumulated scores may be compared with a threshold value in comparator 350. Upon exceeding a threshold value, analyzer 300 may provide the discrepancy descriptors 326, the corresponding suspiciousness scores 328, and the results of the comparison in comparator 350 to report generator 360, whereby the results of the analysis are formatted and provided (via, for example, a display) to a user. The generated report may be used not only to indicate to the user that a file may be harmful, but may be used to augment rule set 180 as well.

Figure 4B:
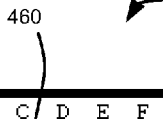

FIG. 4A depicts a hexadecimal representation of an exemplary binary header 400 of a PE file. Of note is the magic number MZ at the start of the DOS header, the bootstrap code 420, and the characters PE at offset 0x80 hex, which denotes the start of the COFF header. FIG. 4B depicts a malicious binary file. Notice that, while the DOS header starts the magic number MZ, the standardized bootstrap code is not included, and the pointer to the start of the COFF header is at 0x0C hex as opposed to the correct value 0x80 hex. The position 0x0C is inside of DOS header itself and, as such, embodiments of the present invention would indicate that the value in the PE header location field is considered suspicious.

FIG. 5A illustrates an exemplary system configuration suitable to practice the present invention. An exemplary data processing apparatus 500 of FIG. 5A includes an input/output (I/O) system 540, through which the data processing apparatus 500 may communicate with peripheral devices and/or with external network devices (not illustrated). Data processing apparatus 500 may include peripheral devices 525 by which data processing apparatus 500 may be operated and controlled and by which a user may interact with data processor apparatus 500. Such peripherals may include a display 527, and one or more Human Interface Devices (HIDs) 529, such as a keyboard, a mouse, a track ball, a stylus, a touch screen, a touchpad, and/or other devices suitable to provide input to the data processing apparatus 500.

The exemplary data processing apparatus 500 of the embodiment illustrated in FIG. 5A includes a processor 520 to, among other things, execute processing instructions that implement various functional modules, such as those described below with reference to FIG. 5B. It is to be understood that the present invention is not limited to a particular hardware configuration or instruction set architecture of the processor 520, which may be configured by numerous structures that perform equivalently to those illustrated and described herein. Moreover, it is to be understood that while the processor 520 is illustrated as a single component, certain embodiments of the invention may include distributed processing implementations through multiple processing elements. The present invention is intended to embrace all such alternative implementations, and others that will be apparent to the skilled artisan upon review of this disclosure.

A storage unit 530 may be utilized to store data and processing instructions on behalf of the exemplary data processing apparatus 520 of FIG. 5A. The storage unit 530 may include multiple segments, such as a code memory 532 to maintain processor instructions to be executed by the processor 520, and data memory 534 to store data, such as data structures on which the processor 520 performs data manipulation operations. The storage unit 530 may include memory that is distributed across components, to include, among others, cache memory and pipeline memory.

Data processing apparatus 500 may include a persistent storage system 535 to store data and processing instructions across processing sessions. The persistent storage system 535 may be implemented in a single persistent memory device, such as a hard disk drive, or may be implemented in multiple persistent memory devices, which may be interconnected by a communication network.

FIG. 5B illustrates an exemplary configuration of functional components suitable to practice certain embodiments of the present invention. The exemplary system illustrated in FIG. 5B may be implemented through processing instructions executed on the processor 520, and in cooperation with other components as illustrated in FIG. 5A, form an exemplary binary file analysis system (BFAS) 550 on the exemplary data processing apparatus 500.

BFAS 550 may include a process controller 560 to coordinate and control the interoperations of the functional components of the monitor system 550 so as to achieve a fully operational file analysis system. For example, the process controller 560 may receive processed data from one functional module and forward the data to another functional module, as well as to indicate such processing to a user, such as through I/O unit 540. The process controller 560 may perform other coordination and control operations according to the implementation of the monitor system 550, and such other operations, as well as the implementation of such, can be embodied by a wide range of well-known process control methods and apparatuses. The present invention is intended to encompass all such alternatives of the process controller 560, including multi-threaded and distributed process control methodologies.

As indicated above, BFAS 250 may include a user interface 565 through which the BFAS 550 interacts with a user. The user interface 565 may be implemented by a combination of hardware devices and suitably programmed processing instructions executed by the processor 520. The user interface 565 may be used to present data to the user in a meaningful form on a display interface 567, such as through graphical representations of file layout, field data assignments, analysis reports, etc., as well as presenting data management interfaces such as file directories, and other images recognized by the user. The user interface 565 may interpret user manipulations of any HIDs thereof into messages and instructions that can be recognized by the process controller 560. The user interface 565 may include a plurality of user controls 569 to afford the user interactivity with and control over the BFAS 250. The user controls 569 may include the HIDs described above, and may also include software implemented controls on the display interface 567, such as toolbars and/or buttons, menus of commands, text command entry blocks, and other suitable software controls. The foregoing description of the user interface 565 may be met by a suitably configured graphical user interface (GUI), the implementation details of such will be omitted in the interest of conciseness.

Exemplary BFAS 550 includes a rules processor 570, by which the rules set 180 may be established. For example, rules processor 570 may implement knowledge aggregator 170 to, for example, identify and categorized new discrepancies, perform statistical analyses, assign suspiciousness scores to descriptors indicative of the discrepancies, etc. Rules processor 570 may also format rules tables, such as lookup table 325, for each data field of interest. The rules tables may be stored in a database 590.

Exemplary BFAS 550 may include an analysis processor 525 by which the contents of binary file 120 may be evaluated against the rules tables stored in database 590. For example, analysis processor 575 may implement analyzer 300, where the data file under analysis may be stored in an isolated storage unit 580 to prohibit interpretation of the contents thereof by a process executing on data processor 500. BFAS 550 may use a general storage unit 585 to retain information during the analysis, such as accumulated scores and formatted reports. The results of the analysis may be presented to a user by way of the user interface 565.

Figure 6:
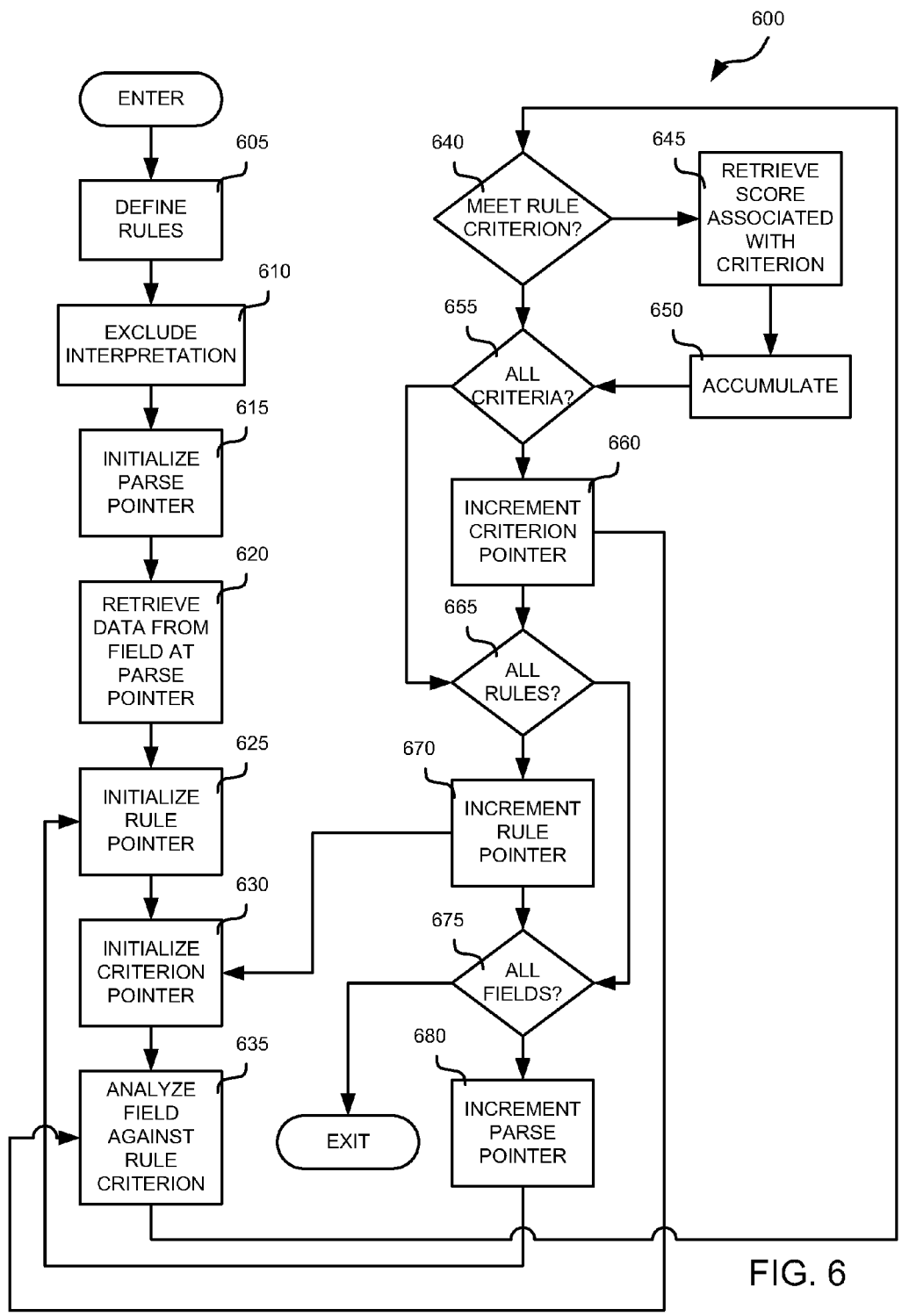
FIG. 6 is a flow diagram illustrating an exemplary analysis process by which the present general inventive process may be embodied.

An exemplary analysis process 600 is illustrated in FIG. 6. In operation 605, rules pertaining to a particular binary file are defined, such as through knowledge aggregator 170. In operation 610, binary data file 120 is stored so as to exclude interpretation thereof by processes executing on the computer platform. A parser is initialized in operation 615 to a known location in binary file 120, such as at the beginning of the file. In operation 620, data are retrieved from the data field pointed to by a parser pointer. In operation 625, a pointer into a rules table is initialized, such as rules table 325, and in operation 630, a pointer into the rules table is initialized to the first rule criterion entered therein. In operation 635, the data in the retrieved field are analyzed against the rule criterion pointed to by criterion pointer. In operation 640, it is determined whether the data retrieved from data file 120 matches the suspiciousness criterion in the rules table. If so, the descriptor and score of the corresponding rules table entry is retrieved in operation 645 and the score is accumulated with scores of analyses of other data fields in operation 650. In operation 655, it is determined whether all criteria in the table have been examined and, if so, it is determined in operation 665 whether all the rules in rules table 325 have been examined. In operation 675, it is determined whether all fields in binary file 120 have been examined. In each case where it is determined that there are data remaining to be analyzed and/or rules against which such data are to be examined, as determined in operation 655, 665, 675, the corresponding pointer is incremented in operations 660, 670, and 680, respectively.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

What is claimed is:

1. A method comprising:
   establishing a set of rules for each of a plurality of fields in a binary file, each rule in the set having associated therewith a suspiciousness score indicative of a potential for adverse operation of a computer if a target process executing on the computer were to interpret contents of the corresponding field;
   retrieving the contents of one of the fields in the binary file in a manner that excludes transfer of control of the computer responsive to the interpretation thereby of the contents;
   evaluating the retrieved contents against the set of rules for the corresponding one of the fields to determine the suspiciousness score for the corresponding one of the fields; and
   indicating that the binary file is suspicious upon affirming that the suspiciousness score meets a criterion,
   wherein the establishing of the rules includes determining a statistical distribution of binary data values indicative of a probability that a particular binary data value contained in the field is interpretable by the target process without the adverse operation, assigning a value to the suspiciousness score for the corresponding rule associated with the field in accordance with the statistical distribution, assigning a set of descriptors to each rule indicative of a corresponding discrepancy in conformance to the rule, and assigning the suspiciousness score to each of the descriptors in accordance with a severity of the discrepancy.

2. The method of claim 1, wherein:
   the retrieving of the contents includes retrieving the contents of each of the fields in the binary file in the manner that excludes transfer of control;
   the evaluating of the contents includes:
   evaluating the plurality of fields against the set of rules corresponding to each; and
   accumulating the suspiciousness score from the evaluation of each of the fields; and
   the indicating the file as suspicious includes indicating that the binary file is suspicious upon affirming that the accumulated suspiciousness score exceeds a threshold.

3. The method of claim 1, wherein the establishing of the rules includes:
   determining a statistical mean of the statistical distribution; and
   assigning the value to the suspiciousness score based on a deviation of the particular data value from the statistical mean.

4. The method of claim 1, wherein the evaluating the retrieved contents includes:
   examining the contents of the field against the descriptors to determine whether one of the descriptors is indicative of a discrepancy therein; and
   retrieving the suspiciousness score associated with the descriptor upon affirming that the discrepancy is indicated thereby.

5. The method of claim 1, wherein the establishing of the rules includes:
   determining a statistical distribution of binary data values indicative of a probability that a particular binary data value contained in the field would result in the adverse operation if interpreted by the target process; and
   assigning a value to the suspiciousness score for the corresponding rule associated with the field in accordance with the statistical distribution.

6. The method of claim 1, wherein the evaluating of the contents includes confining the evaluating to fields of the binary file located in a header of the binary file.

7. The method of claim 1, wherein the establishing of the rules includes:
   establishing at least one rule specifying construction of the binary data file and corresponding structured content thereof so that the content is transferred into a memory device per a standard for transferring content into a memory device.

8. The method of claim 7, wherein the establishing of the at least one rule includes:
   establishing the rule to specify that a data field containing an offset address into the binary data file from which the content is to be transferred is bounded in accordance with the standard for transferring content into a memory device.

9. An apparatus comprising:
   a central processing unit (CPU);
   a memory operatively coupled to the CPU;
   a database, hosted by the memory, having stored therein a set of rules for each of a plurality of fields in a binary file, each rule in the set having associated therewith a suspiciousness score indicative of a potential for adverse operation of a computer if a target process executing on the computer were to interpret contents of the corresponding field;
   an isolated storage unit to store the binary file therein in a manner that excludes transfer of control of the computer responsive to the interpretation thereby of the contents;

an analyzer, controlled by the CPU, to retrieve the contents of one of the fields in the binary file and to evaluate the retrieved contents against the set of rules for the corresponding one of the fields to determine the suspiciousness score for the corresponding one of the fields;

a reporter to indicate that the binary file is suspicious upon affirming that the suspiciousness score meets a criterion; and a knowledge aggregator to assemble the set of rules from at least standards specifying the format and content of the binary file, wherein the knowledge aggregator determines a statistical distribution of binary data values indicative of a probability that a particular binary data value contained in the field would result in the adverse operation if interpreted by a target process, the distribution established from examination of a statistically significant number of samples of the binary data file, the knowledge aggregator assigning a value to the suspiciousness score for the corresponding rule associated with the field in accordance with the statistical distribution, and wherein the database includes a table for a plurality of fields of the binary file, each table containing a set of rule discrepancy descriptors for each rule in the set of rules.

10. The apparatus of claim 9, wherein the knowledge aggregator determines a discrepancy of the rule from the statistical distribution indicating that the binary data value in the corresponding field has been encountered a statistically significant small number of times in a statistically significant large number of binary files examined.

11. The apparatus of claim 9, wherein the knowledge aggregator determines a discrepancy of the rule from the statistical distribution indicating that a data pattern in the field has resulted in harmful or unpredictable computer behavior a statistically significant number of times.

12. A non-transitory computer-readable medium having encoded thereon instructions that, when executed by a processor, performs:

establishing a set of rules for each of a plurality of fields in a binary file, each rule in the set having associated therewith a suspiciousness score indicative of a potential for adverse operation of a computer if a target process executing on the computer were to interpret contents of the corresponding field;

retrieving the contents of one of the fields in the binary file in a manner that excludes transfer of control of the computer responsive to the interpretation thereby of the contents;

evaluating the retrieved contents against the set of rules for the corresponding one of the fields to determine the suspiciousness score for the corresponding one of the fields; and indicating that the binary file is suspicious upon affirming that the suspiciousness score meets a criterion, wherein the establishing of the rules includes determining a statistical distribution of binary data values indicative of a probability that a particular binary data value contained in the field is interpretable by the target process without the adverse operation, assigning a value to the suspiciousness score for the corresponding rule associated with the field in accordance with the statistical distribution, assigning a set of descriptors to each rule indicative of a corresponding discrepancy in conformance to the rule, and assigning the suspiciousness score to each of the descriptors in accordance with a severity of the discrepancy.

\* \* \* \* \*